(12) United States Patent
Liang et al.

(10) Patent No.: US 10,944,112 B2
(45) Date of Patent: Mar. 9, 2021

(54) CURRENT COLLECTOR, ELECTRODE PLATE INCLUDING THE SAME AND ELECTROCHEMICAL DEVICE

(71) Applicant: Contemporary Amperex Technology Co., Limited, Ningde (CN)

(72) Inventors: Chengdu Liang, Ningde (CN); Huafeng Huang, Ningde (CN); Qisen Huang, Ningde (CN); Xin Liu, Ningde (CN)

(73) Assignee: Contemporary Amperex Technology Co., Limited

( * ) Notice: Subject to any disclaimer, the term of this patent is extended or adjusted under 35 U.S.C. 154(b) by 27 days.

(21) Appl. No.: 16/366,357

(22) Filed: Mar. 27, 2019

(65) Prior Publication Data
US 2019/0305320 A1    Oct. 3, 2019

(30) Foreign Application Priority Data
Mar. 30, 2018   (CN) .......................... 201810290303.X

(51) Int. Cl.
| | | |
|---|---|---|
| H01M 4/66 | (2006.01) | |
| H01M 4/80 | (2006.01) | |
| H01M 4/70 | (2006.01) | |
| H01M 4/13 | (2010.01) | |
| H01M 4/02 | (2006.01) | |

(52) U.S. Cl.
CPC ............. *H01M 4/667* (2013.01); *H01M 4/13* (2013.01); *H01M 4/661* (2013.01); *H01M 4/663* (2013.01); *H01M 4/668* (2013.01); *H01M 4/70* (2013.01); *H01M 4/80* (2013.01); *H01M 2004/021* (2013.01)

(58) Field of Classification Search
CPC ................. H01M 4/667; H01M 4/668; H01M 2004/021; H01M 4/70; H01M 4/742; H01M 4/80
See application file for complete search history.

(56) References Cited

U.S. PATENT DOCUMENTS

| | | | |
|---|---|---|---|
| 2006/0035152 A1* | 2/2006 | Nishimura | ........ H01M 10/0431 429/234 |
| 2011/0315213 A1* | 12/2011 | Takada | ................. H01G 9/2022 136/256 |
| 2012/0305073 A1* | 12/2012 | Hayase | ................ H01G 9/0029 136/256 |
| 2012/0315537 A1 | 12/2012 | Ravdel et al. | |

(Continued)

FOREIGN PATENT DOCUMENTS

| | | |
|---|---|---|
| JP | H05205746 A | 8/1993 |
| JP | H10241699 A | 9/1998 |

(Continued)

*Primary Examiner* — Imran Akram
(74) *Attorney, Agent, or Firm* — Forge IP, PLLC

(57) ABSTRACT

The present disclosure relates to the technical field of battery, and in particular, relates to a current collector, an electrode plate including the current collector, and an electrochemical device. The current collector includes an insulation layer; and a conductive layer at least located on at least one surface of the insulation layer. The conductive layer has a thickness of D2, where 30 nm≤D2≤3 μm. The current collector is provided with a plurality of holes penetrating through the insulation layer and the conductive layer.

11 Claims, 4 Drawing Sheets

(56) References Cited

U.S. PATENT DOCUMENTS

| | | | |
|---|---|---|---|
| 2013/0177788 A1* | 7/2013 | Hasegawa | H01M 2/266 |
| | | | 429/62 |
| 2015/0171398 A1* | 6/2015 | Roumi | G01R 31/3828 |
| | | | 429/7 |
| 2015/0311491 A1 | 10/2015 | Deschamps | |
| 2015/0318532 A1* | 11/2015 | Manthiram | H01M 4/134 |
| | | | 429/105 |
| 2016/0322684 A1* | 11/2016 | Choi | H01M 12/08 |
| 2017/0025667 A1* | 1/2017 | Yamawaki | H01M 2/345 |
| 2018/0053977 A1* | 2/2018 | Lebreux | H01M 10/625 |
| 2018/0097251 A1* | 4/2018 | Li | H01M 2/0277 |
| 2018/0102547 A1* | 4/2018 | Yang | H01M 4/80 |

FOREIGN PATENT DOCUMENTS

| | | |
|---|---|---|
| JP | H1167221 A | 3/1999 |
| WO | WO0042669 A1 | 7/2000 |
| WO | WO2015019845 A1 | 2/2015 |

\* cited by examiner

CURRENT COLLECTOR, ELECTRODE PLATE INCLUDING THE SAME AND ELECTROCHEMICAL DEVICE

CROSS-REFERENCE TO RELATED APPLICATIONS

The present application claims priority to Chinese Patent Application No. CN201810290303.X, filed on Mar. 30, 2018, the content of which is incorporated herein by reference in its entirety.

TECHNICAL FIELD

The present disclosure relates to the technical field of battery, and in particular, relates to a current collector, an electrode plate including the current collector, and an electrochemical device.

BACKGROUND

Lithium-ion batteries have been widely applied in electric vehicles and consumer electronic products due to their advantages such as high energy density, high output power, long cycle life, and low environmental pollution. However, when lithium-ion batteries are subjected to abnormal conditions such as extrusion, collision, or puncture, they can easily catch fire or explode, causing serious problems. Therefore, the safety issue of the lithium-ion batteries greatly limits the application of disclosure and popularization of the lithium-ion batteries.

A large number of experimental results show that an internal short circuit in a battery is the ultimate cause of safety hazards of the lithium-ion batteries. In order to avoid the internal short circuit in the battery, the researchers tried to improve the separator structure, battery mechanical structure and the like. Some of these studies have improved the safety performance of lithium-ion batteries by modifying the design of current collectors.

The temperature in the battery may rise when an internal short circuit occurs in the battery due to abnormal conditions such as collision, extrusion, or puncture and the like. According to a technical solution in the related art, alloy having a low melting point is added into the material of a metal current collector. With increasing of the temperature of the battery, the alloy having low-melting point in the current collector begins to melt, thereby resulting in a broken circuit of an electrode plate and cutting off the current. In this way, the safety of the battery is improved. According to another technical solution in the prior art, a multilayered current collector is adopted, in which both sides of a resin layer are connected with metal layers to form a composite. When the temperature of the battery reaches a melting point of the material of the resin layer, the resin layer of the current collector melts to damage the electrode plate, thereby cutting off the current, and enhancing the safety of the battery.

However, these solutions in the related art cannot effectively prevent the occurrence of the internal short circuit in the lithium-ion battery, and cannot guarantee that the battery can continue to operate under the abnormal conditions. In the above solutions, the temperature in the battery would still rise sharply after the internal short circuit occurs in the battery. When the battery temperature rises sharply, if the safety component fails to respond immediately, dangers of different degrees would still occur. In addition, in these solutions, even the safety component responds and successfully avoids the hazard of the battery, the battery still cannot continue to operate.

Therefore, it is necessary to provide a design of a current collector and a battery that can effectively prevent accidents such as firing and explosion caused by the occurrence of the internal short circuit under the abnormal conditions such as collision, extrusion or puncture, without affecting the normal operation of the battery.

SUMMARY

The present disclosure provides a current collector, an electrode plate including the current collector, and an electrochemical device.

A first aspect of the present disclosure provides current collector. The current collector includes: an insulation layer; and a conductive layer at least located on at least one surface of the insulation layer. The conductive layer has a thickness of D2, wherein 30 nm≤D2≤3 μm. The current collector is provided with a plurality of holes penetrating through the insulation layer and the conductive layer.

A second aspect of the present disclosure provides an electrode plate including the current collector according to the first aspect.

A third aspect of the present disclosure provides an electrochemical device including the electrode plate according to the second aspect.

The technical solutions of the present disclosure have at least the following beneficial effects.

In the current collector according to present disclosure, a conductive layer is arranged on the surface of the insulation layer, and the conductive layer has a thickness of D2, which satisfies 30 nm≤D2≤3 μm. On one hand, due to the existence of the thin conductive layer and the insulation layer in the current collector according to the present disclosure, a short-circuit resistance can be increased in the event of the short circuit under abnormal conditions of the battery, so that the short-circuit current and the short-circuit heats generated during the short circuit are greatly reduced, thereby improving the safety performance of the battery. On the other hand, the conductive layer of the current collector of the present disclosure is thin, the metal burrs occurring inside the battery cell under abnormal conditions such as nailing may be small, which can reduce the risk of short circuit caused by the metal burrs piercing the separator and then contacting the negative electrode directly, and thus improve the safety performance of the battery.

Moreover, providing the current collector with the plurality of holes penetrating through the insulation layer and the conductive layer can facilitate stress relief of the conductive layer, thereby greatly improving a binding force between the conductive layer and the insulation layer. Secondly, in abnormal conditions such as nailing, the number of metal burrs occurring inside the battery cell can be reduced, which can further improve the safety performance of the battery. Thirdly, the arrangement of the holes can facilitate electrolyte passing through and improve wettability of electrolyte based on electrodes of the current collector, thereby reducing polarization of the electrodes and the battery and improving electrochemical properties of the battery such as properties of charge-discharge at high rate and cycle life. Fourthly, providing the plurality of holes in the current collector can further reduce the weight of the current collector and increase the weight energy density of the battery.

REFERENCE SIGNS

Figure 1:
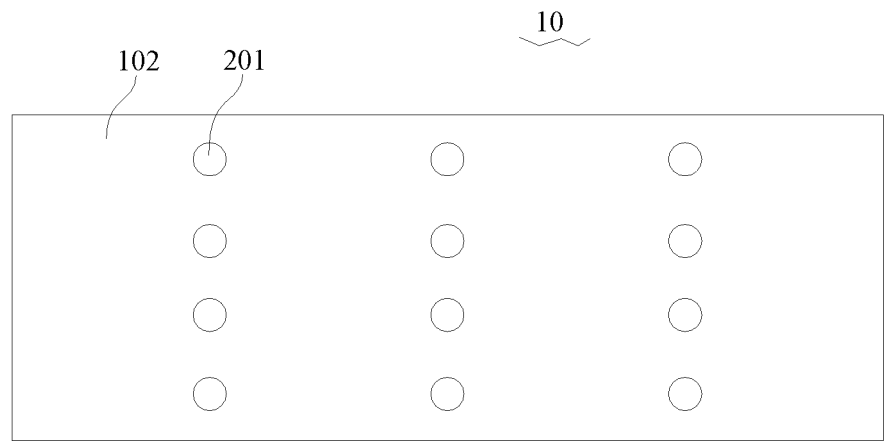
FIG. 1 is a top view of a positive current collector according to an embodiment of the present disclosure.

1—positive electrode plate;
  10—positive current collector;
    101—positive insulation layer;
    102—positive conductive layer;
  11—positive active material layer;
  201—hole;
2—negative electrode plate;
  20—negative current collector;
    201—negative insulation layer;
    202—negative conductive layer;
  21—negative active material layer;
  401—hole;
3—separator;
4—nail.

DESCRIPTION OF EMBODIMENTS

The present disclosure is further described below by means of embodiments. It should be understood that these embodiments are merely used for illustrating the present disclosure, but not intended to limit the present disclosure.

The structure and properties of the current collector according to the first aspect of the embodiments of the present disclosure will be described in details below.

The present disclosure relates to a current collector. The current collector includes an insulation layer and a conductive layer located on at least one surface of the insulation layer. The conductive layer has a thickness of D2, and 30 nm≤D2≤3 μm. The current collector is provided with a plurality of holes penetrating through the insulation layer and the conductive layer.

The insulation layer is used to support the conductive layer, and the conductive layer is used to support an electrode active material layer.

The insulation layer of the current collector according to the present disclosure is non-conductive and the conductive layer of the current collector according to the present disclosure is thin (30 nm≤D2≤3 μm), so its resistance is large. This can increase a short-circuit resistance of the battery when the short circuit occurs under abnormal conditions, such that the short circuit current can be greatly reduced, and thus the heat generated by the short circuit can be greatly reduced, thereby improving the safety performance of the battery.

On the other hand, due to the thin conductive layer of the current collector in the present disclosure, the metal burrs occurring inside the battery cell under abnormal conditions such as nailing may be small, which can reduce the risk of short circuit caused by the metal burrs piercing the separator and then contacting the negative electrode directly, and thus improve the safety performance of the battery.

Moreover, the weight energy density of the battery can be increased by replacing the conventional current collector of a metal foil with the composite current collector of the insulation layer and the conductive layer.

Further, providing the current collector with the plurality of holes penetrating through the insulation layer and the conductive layer can facilitate stress relief of the conductive layer, thereby greatly improving a binding force between the conductive layer and the insulation layer and thus improving the long-term reliability and service life of the current collector according to the present disclosure.

Further, in abnormal conditions such as nailing, the number of burrs, especially metal burrs, occurring when a foreign material pierces the conductive layer and the insulation layer of the current collector can be reduced, which can reduce the risk of short circuit caused by the metal burrs piercing the separator and then contacting the negative electrode directly, and thus improve the safety performance of the battery.

Moreover, the arrangement of the holes can facilitate electrolyte passing through and improve wettability of electrolyte based on electrodes of the current collector, thereby reducing polarization of the electrodes and the battery and improving electrochemical properties of the battery such as properties of charge-discharge at high rate and cycle life.

Moreover, providing the plurality of holes in the current collector can further reduce the weight of the current collector and increase the weight energy density of the battery.

The holes have an aperture in a range from 0.001 mm to 3 mm. In this range, not only the effects of improving safety and polarization can be achieved, but also it is easier to process the current collector, and breakage and the like is unlikely to occur during the processing.

An area ratio of the holes to an entire surface of the conductive layer disposed on one surface of the insulation layer is 0.01% to 10%. Within this range, not only the effects of improving safety and polarization can be achieved, but also it is easier to process the current collector, and breakage and the like is unlikely to occur during the processing.

A spacing between two of the holes is in a range from 0.2 mm to 5 mm. The holes be equally spaced apart from one another or can be in a multi-pitch distribution within the range. As an example, the holes are equally spaced apart from one another.

The shape of the hole may be one of a parallelogram, a parallel-like quadrilateral, a circle, a circle-like, an ellipse, and an ellipse-like shape.

As an example, the conductive layer is not only located on at least one surface of the insulation layer, but also located on wall surfaces of the plurality of holes, and for each of the plurality of holes having the conductive layer disposed on its wall surface, the conductive layer is located on an entirety or a part of the wall surface of the hole.

As an example, a part of the conductive layer located on at least one surface of the insulation layer is partially or entirely connected to a part of the conductive layer located on the wall surfaces of the holes.

In an implementation, the conductive layer is disposed on the upper surface and the lower surface of the insulation layer and is also disposed on wall surfaces of the plurality of holes, and for each of the plurality of holes having the conductive layer disposed on its wall surface, the conductive layer is located on an entirety or a part of the wall surface. In an example, a part of the conductive layer located on the upper surface and the lower surface of the insulation layer is partially or entirely connected to a part of the conductive layer located on the wall surfaces of the holes.

Therefore, the conductive layer firmly "grips" the insulation layer from the at least one surface of the insulation layer and the plurality of holes. The bonding between the insulation layer and the conductive layer is not limited to the plane direction, but also the depth direction, which can strengthen the bonding force between the conductive layer and the insulation layer, thereby improving the long-term reliability and service life of the current collector. Especially when the conductive layer is disposed on the upper surface and the lower surface of the insulation layer and wall surfaces of the plurality of holes, the bonding between the conductive layer and the insulation layer may be stronger.

Moreover, in the current collector, since the insulation is non-conductive and the conductive layer is thin, the conductivity property becomes a "letdown" of the composite current collector. By providing the conductive layer on the at least one surface of the insulation layer and the wall surfaces of the plurality of holes, a three-dimensional conductive network having multiple point positions can be formed in the current collector. This can greatly improve the conductivity property of the composite current collector, reduce the polarization of the electrode plate and the battery, and improve electrochemical properties of the battery such as properties of charge-discharge at high rate and cycle life.

It should be understood that the part of the conductive layer located on the wall surfaces of the plurality of holes and the part of the conductive layer located on at least one surface of the insulation layer may have a same thickness or different thicknesses, and may be made of a same material or different materials. For each of the plurality of holes having the conductive layer disposed on its wall surface, the conductive layer is located on an entirety or a part of the wall surface, preferably on an entirety of the wall surface. As an example, a part of the conductive layer located on at least one surface of the insulation layer is partially or entirely connected to a part of the conductive layer located on the wall surfaces of the holes.

Insulation Layer

In the current collector according to the embodiments of the present disclosure, the insulation layer mainly serves to support and protect the conductive layer and has a thickness of $D1$, where $1 \ \mu m \leq D1 \leq 20 \ \mu m$. If the insulation layer is too thin, it is likely to be broken during the processing process of the electrode plate. If the insulation layer is too thick, a volume energy density of the battery adopting this current collector may be reduced.

An upper limit of the thickness $D1$ of the insulation layer may be 20 µm, 15 µm, 12 µm, 10 µm, or 8 µm. A lower limit of the thickness $D1$ of the insulation layer may be 1 µm, 1.5 µm, 2 µm, 3 µm, 4 µm, 5 µm, 6 µm, or 7 µm. The thickness $D1$ of the insulation layer is in a range consisting of any one upper limit and any one lower limit, preferably, 10 µm, and more preferably, $2 \ \mu m \leq D1 \leq 6 \ \mu m$.

The insulation layer is made of a material selected from a group consisting of an organic polymer insulation material, an inorganic insulation material, a composite material, and combinations thereof. Preferably, the composite material includes an organic polymer insulation material and an inorganic insulation material.

The organic polymer insulation material is selected from a group consisting of polyamide (abbreviated as PA), polyethylene terephthalate (abbreviated as PET), polyimide (abbreviated as PI), polyethylene (abbreviated as PE), polypropylene (abbreviated as PP), polystyrene (abbreviated as PS), polyvinyl chloride (abbreviated as PVC), acrylonitrile butadiene styrene copolymers (abbreviated as ABS), polybutylene terephthalate (abbreviated as PBT), poly-p-phenylene terephthamide (abbreviated as PPA), epoxy resin, poly polyformaldehyde (abbreviated as POM), phenol-formaldehyde resin, ethylene propylene rubber (abbreviated as PPE), polytetrafluoroethylene (abbreviated as PTFE), silicone rubber, polyvinylidene fluoride (abbreviated as PVDF), polycarbonate (abbreviated as PC), aramid fiber, polydiformylphenylenediamine, cellulose and derivatives thereof, starch and derivatives thereof, proteins and derivatives thereof, polyvinyl alcohol and crosslinked products thereof, polyethylene glycol and crosslinked products thereof, and combinations thereof.

The inorganic polymer insulation material is selected from a group consisting of $Al_2O_3$, $SiC$, $SiO_2$, and combinations thereof.

The composite material is preferably selected from a group consisting of epoxy resin glass fiber reinforced composite material, polyester resin glass fiber reinforced composite material, and combinations thereof.

Preferably, the material of the insulation layer is selected from the organic polymer insulation materials. Since the insulation layer usually has a smaller density than the metal, the current collector according to the present disclosure can improve the weight energy density of the battery while improving the safety performance of the battery. In addition, since the insulation layer can well support and protect the conductive layer located on the surface thereof, a breakage of the electrode, which is common in the conventional current collector, is unlikely to occur.

Conductive Layer

In the current collector according to the embodiments of the present disclosure, the conductive layer has a thickness of $D2$, and $30 \ nm \leq D2 \leq 3 \ \mu m$.

The conductive layer is made of a material selected from a group consisting of a metal conductive material, a carbon-based conductive material, and combinations thereof. The metal conductive material is preferably selected from a group consisting of aluminum, copper, nickel, titanium, silver, nickel-copper alloy, aluminum-zirconium alloy, and combinations thereof. The carbon-based conductive material is preferably selected from a group consisting of graphite, acetylene black, graphene, carbon nanotubes, and combinations thereof.

In the existing lithium-ion batteries in which an Aluminum foil or a copper foil is used as a current collector, when an internal short circuit occurs in the battery under an abnormal situation, a large current would be instantaneously generated, a large quantity of heat is generated by the short circuit correspondingly. The heat usually further results in aluminothermal reaction at the positive current collector made of aluminum foil, which can cause the firing, explosion, etc. of the battery.

In the embodiments of the present disclosure, the above technical problems are solved by using a current collector, in which an insulation layer serves as a support and the conductive layer has a specific thickness (30 nm≤D2≤3 µm). Since the insulation layer is non-conductive and the conductive layer is much thinner than the conventional current collector (which has a thickness of about 9 µm to 14 µm), the current collector has a relatively high resistance. In this way, in the event of the short circuit under abnormal conditions of the battery, a short-circuit resistance can be increased, so that the short-circuit current and thus the generated short-circuit heat can be greatly reduced, thereby improving the safety performance of the battery.

Generally, the internal resistance of the battery includes ohmic internal resistance of the battery and internal resistance of the battery polarization. The resistances of the active material, current collector and interface, and the electrolyte composition all have a significant influence on the internal resistance of the battery. In the event of the short circuit under abnormal conditions, the internal resistance of the battery will be greatly reduced due to the occurrence of the internal short circuit. Therefore, by increasing the resistance of the current collector, the internal resistance of the battery in the event of the short circuit can be increased, thereby improving the safety performance of the battery.

The conductive layer has a thickness which is sufficient to have effects of conduction and current collection. If the thickness of the conductive layer is too small, the effects of conduction and current collection are too poor, the polarization of the battery can be severe, and the conductive layer is also likely to be damaged during the processing process of the electrode plate. If the thickness of the conductive layer is too large, a weight energy density of the battery can be affected, and it is not conducive to improving the safety performance of the battery.

An upper limit of the thickness D2 of the conductive layer may be 3 µm, 2.8 µm, 2.5 µm, 2.3 µm, 2 µm, 1.8 µm, 1.5 µm, 1.2 µm, 1 µm, or 900 nm. A lower limit of the thickness D2 of the conductive layer may be 800 nm, 700 nm, 600 nm, 500 nm, 450 nm, 400 nm, 350 nm, 300 nm, 250 nm, 200 nm, 150 nm, 100 nm, or 30 nm. The thickness of the conductive layer is in a range consisting of any one upper limit and any one lower limit, preferably, 300 nm≤D2≤2 µm, and more preferably, 500 nm≤D2≤1.5 µm.

The conductive layer can formed on the insulation layer by means of at least one of vapor deposition and electroless plating. With respect to the vapor deposition, physical vapor deposition (PVD) is preferable. Preferably, the physical vapor deposition is at least one of evaporation deposition and sputtering deposition. As regards the evaporation deposition, at least one of vacuum evaporation, thermal evaporation deposition, electron beam evaporation method (EBEM) is preferable. As regards the sputtering deposition, magnetron sputtering is preferable.

FIGS. 1-9 are schematic structural diagrams of current collectors according to the embodiments of the present disclosure.

Figure 2:
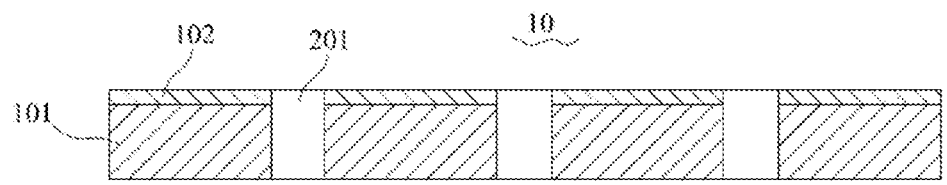
FIG. 2 is a section view of the positive current collector as shown in FIG. 1.
Figure 3:
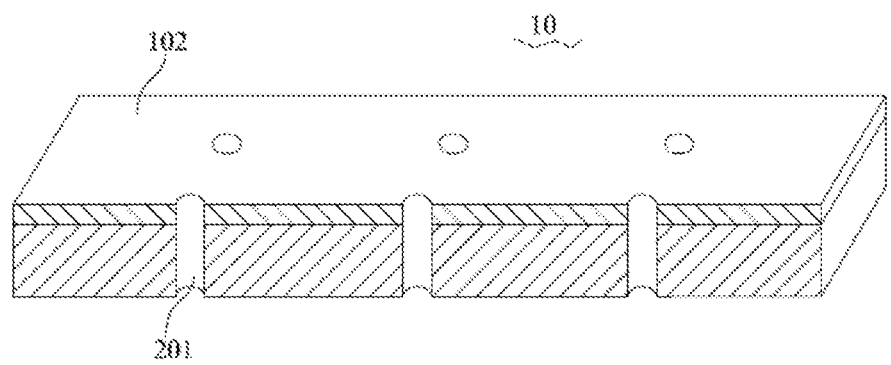
FIG. 3 is a three-dimensional section view of the positive current collector as shown in FIG. 1.

As shown in FIGS. 1-3, the positive current collector 10 includes a positive insulation layer 101 and a positive conductive layer 102 provided on one surface of the positive insulation layer 101. The positive current collector 10 is provided with a plurality of holes 201 penetrating through the positive insulation layer 101 and the positive conductive layer 102, and the positive conductive layer 102 is not formed on wall surfaces of the holes 201.

Figure 4:
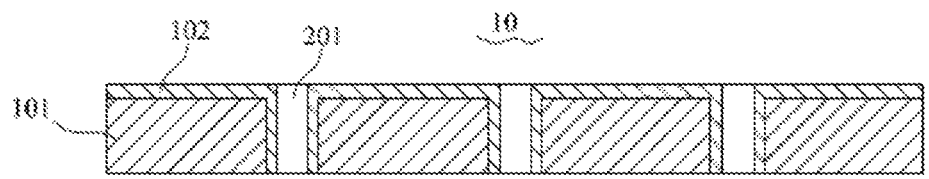
FIG. 4 is a structural schematic diagram of another positive current collector according to an embodiment of the present disclosure.

As shown in FIG. 4, the positive current collector 10 includes a positive insulation layer 101 and a positive conductive layer 102 provided on one surface of the positive insulation layer 101. The positive current collector 10 is provided with a plurality of holes 201 penetrating through the positive insulation layer 101 and the positive conductive layer 102, and the positive conductive layer 102 is also located on all wall surfaces of the holes 201.

Figure 5:
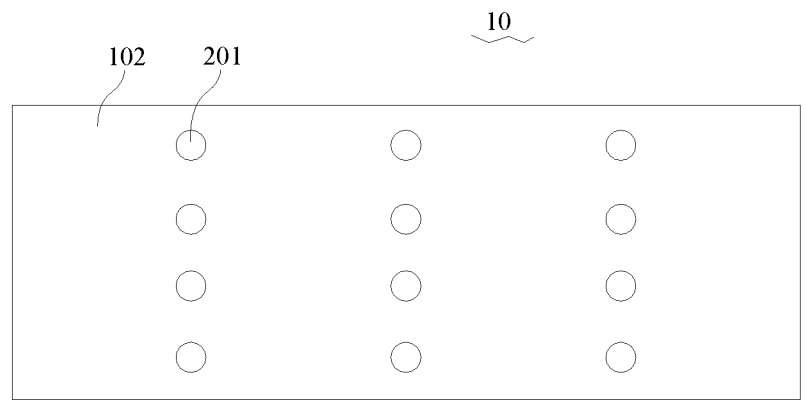
FIG. 5 is a top view of another positive current collector according to an embodiment of the present disclosure.
Figure 6:
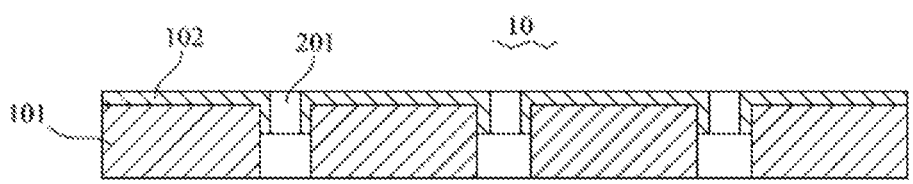
FIG. 6 is a section view of the positive current collector as shown in FIG. 5.
Figure 7:
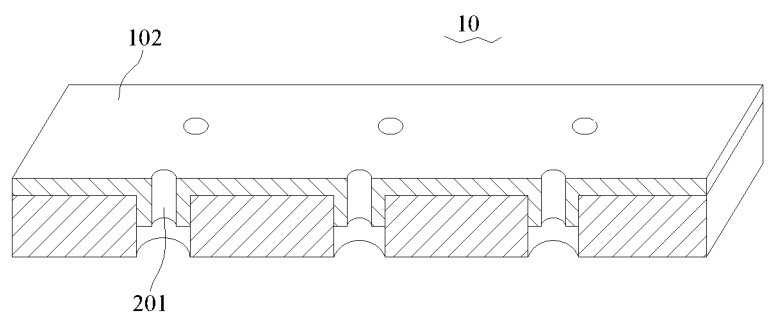
FIG. 7 is a three-dimensional section view of the positive current collector as shown in FIG. 5.

Referring to FIGS. 5-7, the positive current collector 10 includes a positive insulation layer 101 and a positive conductive layer 102 provided on one surface of the positive insulation layer 101. The positive current collector 10 is provided with a plurality of holes 201 penetrating through the positive insulation layer 101 and the positive conductive layer 102. The positive conductive layer 102 is also located on a part of wall surfaces of the holes 201, and a part of the positive conductive layer 102 located on the wall surfaces is connected to a part of the positive conductive layer 102 located on the surface of the positive insulation layer 101.

Figure 8:
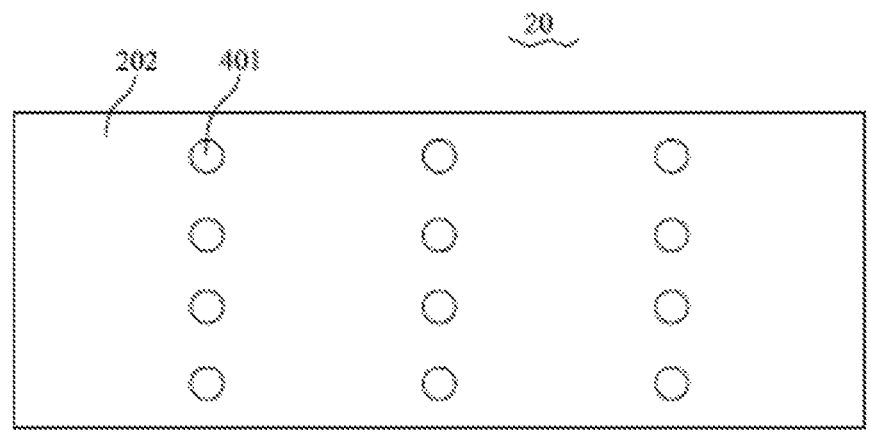
FIG. 8 is a top view of another negative current collector according to an embodiment of the present disclosure.
Figure 9:
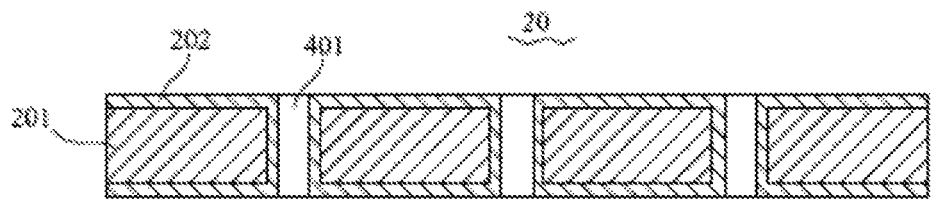
FIG. 9 is a section view of the negative current collector as shown in FIG. 8.
Figure 10:
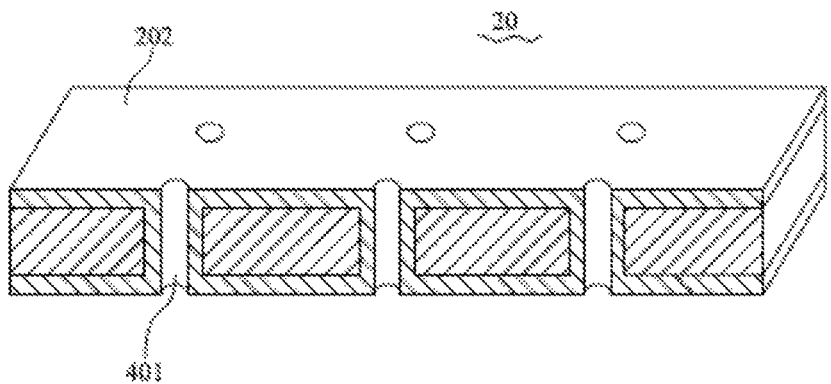
FIG. 10 is a three-dimensional section view of the negative current collector as shown in FIG. 8.

Referring to FIGS. 8-10, the negative current collector 20 includes a negative insulation layer 201 and a negative conductive layer 202 provided on two opposite surfaces of the negative insulation layer 201. The negative current collector 20 is provided with a plurality of holes 401 penetrating through the negative insulation layer 201 and the negative conductive layer 202. The negative conductive layer 202 is also located on all wall surfaces of the holes 401, and a part of the negative conductive layer 202 located on the negative insulation layer 201 is connected to a part of the negative conductive layer 202 located on the on the wall surfaces.

The second aspect of the present disclosure provides an electrode plate. The electrode plate includes the current collector according to the first aspect of the present disclosure and an electrode active material layer formed on the current collector.

Figure 11:
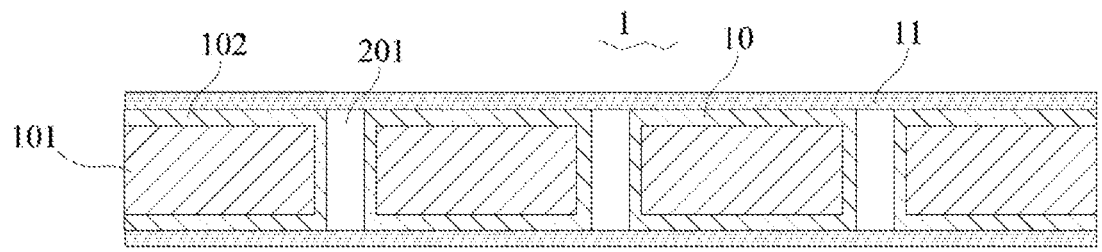
FIG. 11 is a section view of a positive electrode plate according to an embodiment of the present disclosure.

FIG. 11 is a schematic structural diagram of a positive electrode plate according to an embodiment of the present disclosure. As shown in FIG. 11, the positive electrode plate 1 includes a positive current collector 10 and a positive active material layer 11 formed on a surface of the positive current collector 10. The positive current collector 10 includes a positive insulation layer 101 and a positive conductive layer 102 disposed on two opposite surfaces of the positive insulation layer 101. The positive current collector 10 is provided with a plurality of holes 201 penetrating through the positive insulation layer 101 and the positive conductive layer 102. The positive conductive layer 102 is also located on all wall surfaces of the plurality of holes 201, and a part of the positive conductive layer 102 located on the positive insulation layer 101 is connected to a part of the positive conductive layer 102 located on the wall surfaces of the holes. The positive active material layer 11 is disposed on the positive conductive layer 102 and covers the plurality of holes 201, but is not filled in the plurality of holes 201. In practice, after being coated or dried and then compacted, the positive active material layer 11 may intrude into the holes through openings of the holes.

Figure 12:
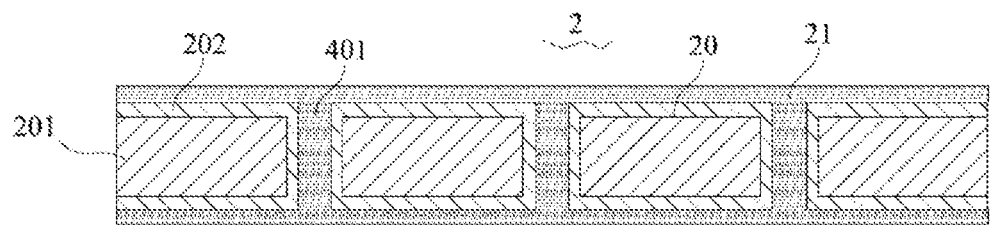
FIG. 12 is a section view of another negative electrode plate according to an embodiment of the present disclosure.

FIG. 12 is a schematic structural diagram of a negative electrode plate according to embodiments of the present disclosure. As shown in FIG. 12, the negative electrode plate 2 includes a negative current collector 20 and a negative active material layer 21 formed on a surface of the negative current collector 20. The negative current collector 20 includes a negative insulation layer 201 and two negative conductive layers 202 disposed on two opposite surfaces of the negative insulation layer 201. The negative current collector 20 is provided with a plurality of holes 401 penetrating through the negative insulation layer 201 and the negative conductive layer 202. The negative conductive layer 202 is also located on all wall surfaces of the plurality of holes 401, and a part of the negative conductive layer 202 located on the negative insulation layer 201 is connected to a part of the negative conductive layer 202 located on the wall surfaces of the holes. The negative active material layer 21 is disposed on the negative conductive layer 202 and is filled in the plurality of holes 401.

It should be noted that FIGS. 1-12 are merely illustrative, and sizes, shapes and arrangements of the holes in the drawings are all illustrative.

It would be appreciated that when the conductive layer is arranged on both two opposite surfaces of the insulation layer, the current collector is coated with the active material on its two surfaces and the manufactured positive and negative electrode plates can be directly applied in the electrochemical device; and when the conductive layer is arranged on one surface of the insulation layer, the current collector is coated with the active material on its one surface and the manufactured positive and negative electrode plates can be applied in the battery after being folded.

The electrode active material layer can be formed on at least one surface of the current collector. In this case, the electrode active material layer is arranged on the surface of the current collector and covers the plurality of holes. As an example, when the conductive layer is arranged on the wall surfaces of the holes and the holes have an aperture not larger than 35 μm, the electrode active material layer can be formed on the at least one surface of the current collector and grout leaking is unlikely to occur. After being dried and compacted, the electrode active material layer may intrude into the holes through openings of the holes.

In an example, the electrode active material layer is formed on at least one surface of the current collector, and can be entirely or partially filled in the plurality of holes of the current collector. Preferably, the electrode active material layer formed on at least one surface of the current collector and the electrode active material layer filled in the plurality of holes of the current collector are partially or entirely connected to each other. In this way, the bonding force between the electrode active material layer and the current collector is stronger, and the long-term reliability and service life of the electrode plate and the battery can be improved. In addition, since the electrode active material layer has a certain porosity, such arrangement can have better electrolyte wettability and smaller polarization as compared with an electrode plate formed by a composite current collector of a pore less structure.

The embodiments of the present disclosure also provide an electrochemical device. The electrochemical device includes a positive electrode plate, a separator and a negative electrode plate. The electrochemical device can be a wound type or a laminated type battery, such as one of a lithium ion secondary battery, a primary lithium battery, a sodium ion battery, or a magnesium ion battery. However, it is not limited to these batteries.

The positive electrode plate and/or the negative electrode plate are the electrode plate according to the above embodiments of the present disclosure.

As an example, the positive electrode plate of the battery according to the present disclosure employs the electrode plate according to the present disclosure. Since the conventional positive current collector has a high aluminum content, when the short circuit occurs under the abnormal condition of the battery, the heat generated at the short-circuit point can cause a severe aluminothermal reaction, which generates a huge amount of heat and further causes the explosion or other accidents of the battery. When the battery adopts the positive electrode plate according to the present disclosure, the aluminothermal reaction can be avoided due to the greatly reduced aluminum content in the positive current collector, thereby significantly improving the safety performance of the battery. The current collector is provided with a plurality of holes penetrating through the insulation layer and the conductive layer, thereby facilitating the electrolyte passing through, improving wettability of the electrolyte based on electrodes of the current collector, thereby reducing polarization of the electrodes and the battery and improving electrochemical properties of the battery such as properties of charge-discharge at high rate and cycle life. Moreover, providing the plurality of holes in the current collector can further reduce the weight of the current collector and increase the weight energy density of the battery.

Figure 13:
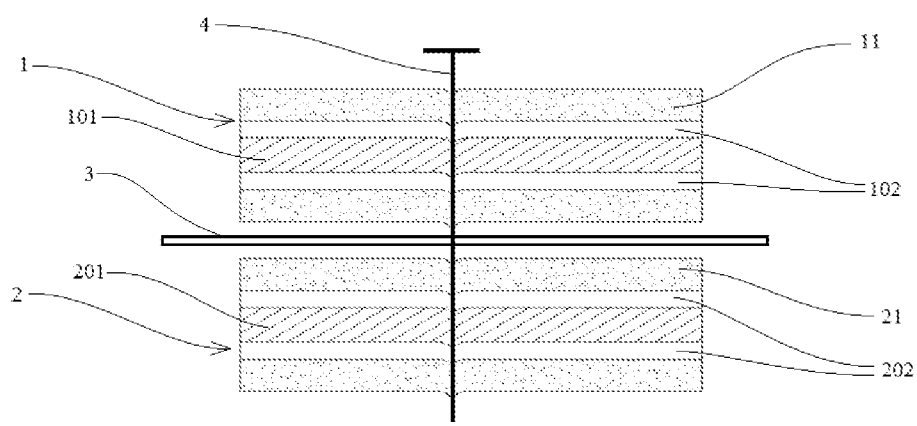
FIG. 13 is a schematic diagram of a nailing experiment according to the present disclosure (without holes illustrated).

In the present disclosure, a nailing experiment is used to simulate the abnormal conditions of the battery and observe a change of the battery after the nailing. FIG. 13 is a schematic diagram of a nailing experiment according to the present disclosure. For the reason of simplicity, FIG. 13 merely illustrates that a nail 4 punctures one layer of positive electrode plate 1, one layer of separator 3 and one layer of negative electrode plate 2 of the battery. It should be clear that in the actual nailing experiment, the nail 4 penetrates the entire battery, which generally includes a plurality of layers of positive electrode plate 1, a plurality of layers of separator 3 and a plurality of layers of negative electrode plate 2. When a short circuit occurs in the battery due to the nailing, the short-circuit current is greatly reduced, and the heat generated during the short circuit is controlled within a range that the battery can fully absorb. Therefore, the heat generated at the position where the internal short-circuit occurs can be completely absorbed by the battery, and the increase in temperature is also very small, so that the damage on the battery caused by the short circuit can be limited to the nailing position, and only a "point break" can be formed without affecting the normal operation of the battery in a short time.

EMBODIMENTS

1. Preparation of Current Collector 1.1 An insulation layer having a certain thickness is selected, perforation is performed in the insulation layer to form holes, and then a conductive layer having a certain thickness is formed by means of vacuum evaporation in such a manner that the conductive layer is deposited on at least one surface of the insulation layer and the wall surfaces of the holes.

1.2 An insulation layer having a certain thickness is selected, a conductive layer having a certain thickness is formed by means of vacuum evaporation on a surface of the insulation layer, and then perforation is performed to form holes penetrating through the insulation layer and the conductive layer.

1.3 An insulation layer having a certain thickness is selected, perforation is performed to form holes, and then a conductive layer is deposited on the surface of the plane and the wall surfaces of the holes or on the wall surfaces of the holes and the surface of the plane.

The conditions of the vacuum evaporation for forming the conductive layer are as follows: the insulation layer is placed in a vacuum evaporation chamber after a surface cleaning treatment, a high-purity metal wire in a metal evaporation chamber is melted and evaporated at a high temperature in a range of 1600° C. to 2000° C., the evaporated metal passes through a cooling system in the vacuum evaporation chamber and is finally deposited on a surface of the insulation layer, so as to form the conductive layer.

2. Preparation of Electrode Plate

Positive slurry or negative slurry is coated on a surface of the current collector by a conventional coating process of battery and dried at 100° C., so as to obtain a positive electrode plate or a negative electrode plate.

Conventional positive electrode plate: current collector is an Al foil with a thickness of 12 μm, and the electrode active material layer is a ternary (NCM) material layer having a certain thickness.

3. Preparation of Battery:

According to a conventional battery preparing process, a positive electrode plate (compaction density: 3.4 g/cm$^3$), a PP/PE/PP separator and a negative electrode plate (compaction density: 1.6 g/cm$^3$) together are winded to form a bare cell, then the bare cell is placed into a battery case, an electrolyte (EC:EMC in a volume ratio of 3:7, LiPF$_6$:1 mol/L) is injected into the case, following by sealing, formation, and the like, so as to obtain a lithium-ion secondary battery.

Specific compositions of the batteries prepared in the embodiments of the present disclosure and the batteries of the Comparative Examples are shown in Table 2.

TABLE 1

| Electrode Plate No. | Insulation Layer | | Conductive Layer | | With or without holes | States of holes | Electrode active material layer | |
|---|---|---|---|---|---|---|---|---|
| | Material | D1 | Material | D2 | | | Material | Thickness |
| Electrode Plate 1 | PI | 6 μm | Al | 2 μm | Without holes | / | NCM | 55 μm |
| Electrode Plate 2 | PET | 1 μm | Al | 30 nm | With holes | Surface only | LCO | 55 μm |
| Electrode Plate 3 | PI | 2 μm | Al | 300 nm | With holes | Surface and holes | NCM | 55 μm |
| Electrode Plate 4 | PET | 10 μm | Al | 500 nm | With holes | Surface and holes | NCM | 55 μm |
| Electrode Plate 5 | PET | 8 μm | Ni | 800 nm | With holes | Surface and holes | NCM | 55 μm |
| Electrode Plate 6 | PI | 20 μm | Al | 1 μm | With holes | Surface and holes | NCM | 55 μm |
| Electrode Plate 7 | PET | 6 μm | Al | 1.5 μm | With holes | Surface and holes | NCM | 55 μm |
| Electrode Plate 8 | PET | 6 μm | Al | 2 μm | With holes | Surface and holes | NCM | 55 μm |

Conventional negative electrode plate: current collector is a Cu foil with a thickness of 8 μm, and the electrode active material layer is a graphite layer having a certain thickness.

In some embodiments, the electrode active material layer is disposed only in a planar portion of the current collector. In some embodiments, the electrode active material layer is disposed in a planar portion the holes of the current collector.

The specific parameters of the prepared current collector and its electrode plates are shown in Table 1. Parameters of the insulation layer, the conductive layer and the electrode active material parameters of the current collector of Electrode Plates 1 to 8 are shown in Table 1, in which the conductive layer is disposed on the upper surface and the lower surface of the insulation layer, and the conductive layer is formed by means of vacuum evaporation. "Surface only" means that the current collector is provided with a plurality of holes penetrating through the insulation layer and the conductive layer, and the conductive layer is disposed only on the upper surface and the lower surface of the insulation layer. "Surface and holes" means that the current collector is provided with a plurality of holes penetrating through the insulation layer and the conductive layer, the conductive layer is disposed not only on the upper surface and the lower surface of the insulation layer but also on all wall surfaces of the holes, and a part of the conductive layer formed on the wall surfaces of the holes is connected to a part of the conductive layer formed on the surface of the insulation layer. The holes are circular and have an aperture of 0.01 mm, the area ratio of the holes is selected to be 5%, and a spacing between two of the holes is 0.2 mm. The electrode active material is filled in a plurality of holes.

TABLE 2

| Battery No. | Composition of Electrodes | |
|---|---|---|
| Battery 1 | conventional positive electrode plate | conventional negative electrode plate |
| Battery 2 | electrode plate 1 | conventional negative electrode plate |
| Battery 3 | electrode plate 2 | conventional negative electrode plate |
| Battery 4 | electrode plate 3 | conventional negative electrode plate |
| Battery 5 | electrode plate 4 | conventional negative electrode plate |
| Battery 6 | electrode plate 5 | conventional negative electrode plate |
| Battery 7 | electrode plate 6 | conventional negative electrode plate |
| Battery 8 | electrode plate 7 | conventional negative electrode plate |
| Battery 9 | electrode plate 8 | conventional negative electrode plate |

EXPERIMENTAL EXAMPLES

1. Test Methods of Cycle Life of Battery:

A method for testing cycle life of the lithium-ion battery was performed as follows:

A lithium-ion battery was charged and discharged at 25° C. and 45° C., respectively, i.e., the battery was firstly charged with a current of 1 C to a voltage of 4.2V, then was discharged with a current of 1 C to a voltage of 2.8V, and the discharge capacity after a first cycle was recorded; and the battery was charged and discharged for 1000 cycles as above, and the discharge capacity of the battery after a 1000th cycle was recorded. A capacity retention rate after the 1000$^{th}$ cycle was obtained by dividing the discharge capacity after the 1000$^{th}$ cycle by the discharge capacity after the first cycle.

The experimental results are shown in Table 3.

2. Test Methods of Nailing Experiment:

Nailing Experiment: a battery that had been fully charged was fixed, a steel needle with a diameter of 8 mm punctured through the battery at a speed of 25 mm/s at room temperature and remained in the battery, and the battery was observed and measured after the nailing was finished.

Measurement of Battery Temperature: a multichannel thermometer was used, and the temperature sensing wires were respectively attached on geometric centers of a nail-inserting surface and an opposite surface of the battery to be nailed; after the nailing was finished, temperature of the battery was measured and tracked for 5 minutes, and the temperatures of the battery at the end of 5 minutes were recorded.

Measurement of Battery Voltage: positive and negative electrodes of each battery to be nailed were connected to test terminals of an internal resistance instrument; after the nailing was finished, voltage of each battery was measured and tracked for 5 minutes, and the voltage of the battery at the end of 5 minutes was recorded.

Data of the recorded temperatures and voltages of the batteries are shown in Table 4.

3. Test Methods of Bonding Force between Conductive Layer and Insulation Layer:

The electrode plate was immersed in a mixed solvent of dimethyl carbonate and hydrofluoric acid, in which content of the hydrofluoric acid was 0.1 wt %, and then was vacuum-sealed and stored in a 70° C. incubator for several days. After the storage, the electrode plate was taken out, and folded in half along a length direction. At the same time, a 2 Kg weight was placed on the fold to compact it for 10 seconds. After the compaction, the electrode plate was flattened and then observed to see if the conductive layer peels off at the fold, and the number of days for which the electrode plate had been stored before the peeling off started to appear was recorded. The test results are shown in Table 5.

TABLE 3

| Battery No. | Capacitance Retention Rate at the 1000$^{th}$ Cycle | |
| --- | --- | --- |
|  | 25° C. | 45° C. |
| Battery 1 | 87.9% | 83.2% |
| Battery 2 | 81.3% | 78.1% |
| Battery 3 | 84.6% | 80.2% |
| Battery 4 | 86.7% | 81.5% |
| Battery 5 | 87.9% | 82.1% |
| Battery 6 | 88.0% | 83.2% |
| Battery 7 | 87.8% | 82.8% |
| Battery 8 | 88.0% | 82.6% |
| Battery 9 | 87.8% | 82.4% |

TABLE 4

| Battery No. | Nailing Experiment | |
| --- | --- | --- |
|  | Batter Temperature Rise (° C.) | Battery Voltage (V) |
| Battery 1 | N/A | N/A |
| Battery 2 | 17.2 | 3.85 |
| Battery 3 | 2.3 | 4.13 |
| Battery 4 | 2.9 | 4.13 |
| Battery 5 | 5.0 | 4.11 |
| Battery 6 | 5.6 | 4.10 |
| Battery 7 | 8.9 | 3.97 |
| Battery 8 | 11.7 | 3.91 |
| Battery 9 | 14.1 | 3.89 |

"N/A" indicates that thermal runaway and damage happened immediately after a steel needle punctured through the battery.

TABLE 5

| Electrode Plate No. | Number of Days |
| --- | --- |
| Electrode Plate 1 | 10 |
| Electrode Plate 2 | 18 |
| Electrode Plate 3 | >30 |
| Electrode Plate 4 | >30 |
| Electrode Plate 5 | >30 |
| Electrode Plate 6 | >30 |
| Electrode Plate 7 | >30 |
| Electrode Plate 8 | >30 |

From the results in Table 4, it can be seen that, as regards Battery 1 which does not adopting the current collector according to the embodiments of the present disclosure (i.e., the battery formed by adopting the conventional positive electrode plate and the conventional negative electrode plate), the temperature increased abruptly by hundreds of degree Celsius and the voltage dropped abruptly to zero at the moment of nailing. This shows that an internal short circuit occurred at the moment of nailing, a large amount of heats was generated, a thermal runaway and damage of the battery instantly occurred, so that the battery is unable to continue operating.

Compared with a battery formed by a conventional positive electrode plate and a conventional negative electrode plate, the composite current collector according to the present disclosure can greatly improve the safety performance of the battery, and the smaller thickness of the conductive layer can lead to the more obvious improvement effect on safety. In addition, the composite current collector with holes may be more conductive to an improvement in safety performance as compared to a composite current collector without holes.

It can be seen from the results in Table 4 that, compared with the battery adopting the conventional positive electrode plate and the conventional negative electrode plate, the batteries adopting the current collectors according to the embodiments of the present disclosure have a good cycle performance, which is equivalent to the cycle performance of a conventional battery. This shows that the current collectors according to the embodiments of the present disclosure do not have any significantly adverse influence on the resulting electrode plates and batteries.

It can be seen from the results in Table 5 that in the composite current collector having holes, the bonding force between the conductive layer and the insulation layer is significantly enhanced with respect to the composite current collector without holes. In particular, when the conductive layer is disposed on the surface of the insulation layer and the wall surfaces of the plurality of holes, the conductive layer firmly "grips" the insulation layer from at least one surface of the insulation layer and the plurality of holes. The bonding between the insulation layer and the conductive layer is not limited to the plane direction, but also the depth direction, which can strengthen the bonding force between the conductive layer and the insulation layer, thereby improving the long-term reliability and service life of the current collector.

The preferable embodiments of the present disclosure are disclosed above but are not used to limit the claims. Those skilled in the art may make possible changes and modifications without departing from the concept of the present disclosure. Therefore, the protection scope of the present disclosure is defined by the attached claims.

What is claimed is:

1. An electrochemical device, comprising a positive electrode plate, a negative electrode plate, and a separator disposed between the positive electrode plate and the negative electrode plate, wherein the positive electrode plate and/or the negative electrode plate comprises a current collector and an electrode active material layer at least formed on at least one surface of the current collector, wherein the current collector comprises:
   an insulation layer; and
   a conductive layer at least located on at least one surface of the insulation layer,
   wherein the conductive layer has a thickness of D2, where 30 nm≤D2≤3 μm,
   wherein a plurality of through holes each penetrates through the insulation layer and the conductive layer,
   wherein the electrode active material layer is further filled in the plurality of through holes, and
   wherein a part of the electrode active material layer formed on the at least one surface of the current collector is partially or entirely connected to a part of the electrode active material layer filled in the plurality of through holes.

2. The electrochemical device according to claim 1, wherein the conductive layer is further arranged on wall surfaces of the plurality of through holes, and for each of the plurality of through holes having the conductive layer disposed on its wall surface, the conductive layer is located on a part or an entirety of the wall surface.

3. The electrochemical device according to claim 2, wherein a part of the conductive layer located on the at least one surface of the insulation layer is partially or entirely connected to a part of the conductive layer located on the wall surfaces of the plurality of through holes; and preferably, the at least one surface of the insulation layer comprises an upper surface and a lower surface of the insulation layer, and a part of the conductive layer located on the upper surface and the lower surface of the insulation layer is partially or entirely connected to the part of the conductive layer located on the wall surfaces of the plurality of through holes.

4. The electrochemical device according to claim 1, wherein 300 nm≤D2≤2 μm.

5. The electrochemical device according to claim 1, wherein 500 nm≤D2≤1.5 μm.

6. The electrochemical device according to claim 1, wherein the conductive layer is made of a material selected from a group consisting of a metal conductive material, a carbon-based conductive material, and combinations thereof,
   wherein the metal conductive material is preferably selected from a group consisting of aluminum, copper, nickel, titanium, silver, nickel-copper alloy, aluminum-zirconium alloy, and combinations thereof, and
   wherein the carbon-based conductive material is preferably selected from a group consisting of graphite, acetylene black, graphene, carbon nanotubes, and combinations thereof.

7. The electrochemical device according to claim 1, wherein the insulation layer has a thickness of D1, and wherein 1 μm≤D1≤20 μm.

8. The electrochemical device according to claim 7, wherein 2 μm≤D1≤10 μm.

9. The electrochemical device according to claim 7, wherein 2 μm≤D1≤6 μm.

10. The electrochemical device according to claim 1, wherein the insulation layer is made of a material selected from a group consisting of an organic polymer insulation material, an inorganic insulation material, a composite material, and combinations thereof,
   the organic polymer insulation material is selected from a group consisting of polyamide, polyethylene terephthalate, polyimide, polyethylene, polypropylene, polystyrene, polyvinyl chloride, acrylonitrile butadiene styrene copolymers, polybutylene terephthalate, poly-p-phenylene terephthamide, epoxy resin, polyformaldehyde, phenol-formaldehyde resin, ethylene propylene rubbe, polytetrafluoroethylene, silicone rubber, polyvinylidene fluoride, polycarbonate, aramid fiber, polydiformylphenylenediamine, cellulose and derivatives thereof, starch and derivatives thereof, proteins and derivatives thereof, polyvinyl alcohol and cross-linked products thereof, polyethylene glycol and cross-linked products thereof, and combinations thereof,
   the inorganic insulation material is selected from a group consisting of aluminium oxide, silicon carbide, silicon dioxide and combinations thereof, and
   the composite material is selected from a group consisting of an epoxy resin glass fiber reinforced composite material, a polyester resin glass fiber reinforced composite material, and combinations thereof.

11. The electrochemical device according to claim 10, wherein the insulation layer is made of the organic polymer insulation material.

* * * * *